(12) United States Patent
Fox et al.

(10) Patent No.: US 8,097,197 B2
(45) Date of Patent: Jan. 17, 2012

(54) METHOD FOR MANUFACTURING A SEALABLE CONTAINER CLOSURE

(75) Inventors: Robert W. Fox, Williamsburg, VA (US); Dieter F. Lay, Oconomowoc, WI (US); Richard A. Gross, Oconomowoc, WI (US)

(73) Assignee: Plastech, Inc., Williamsburg, VA (US)

( * ) Notice: Subject to any disclaimer, the term of this patent is extended or adjusted under 35 U.S.C. 154(b) by 0 days.

(21) Appl. No.: 12/543,286

(22) Filed: Aug. 18, 2009

(65) Prior Publication Data

US 2009/0302040 A1 Dec. 10, 2009

Related U.S. Application Data

(63) Continuation of application No. 11/589,505, filed on Oct. 30, 2006, now abandoned, which is a continuation of application No. 10/642,923, filed on Aug. 18, 2003, now abandoned.

(60) Provisional application No. 60/404,227, filed on Aug. 16, 2002.

(51) Int. Cl.
  *B29C 45/14* (2006.01)

(52) U.S. Cl. .......... 264/251; 264/255; 264/254
(58) Field of Classification Search .......... None
  See application file for complete search history.

(56) References Cited

U.S. PATENT DOCUMENTS

| | | | | |
|---|---|---|---|---|
| 4,728,477 A | * | 3/1988 | Dromigny | 264/509 |
| 4,741,450 A | * | 5/1988 | Braude | 220/712 |
| 5,037,595 A | * | 8/1991 | Kornelis | 264/153 |
| 5,125,528 A | * | 6/1992 | Heyn et al. | 220/269 |
| 5,273,416 A | * | 12/1993 | Heyn et al. | 425/126.1 |
| 5,360,588 A | * | 11/1994 | Heyn et al. | 264/153 |
| 5,685,443 A | * | 11/1997 | Taber et al. | 215/252 |
| 5,692,635 A | * | 12/1997 | Farrell et al. | 220/270 |
| 5,830,398 A | * | 11/1998 | Heyn et al. | 264/154 |
| 6,033,613 A | * | 3/2000 | Heyn et al. | 264/259 |
| 6,258,312 B1 | * | 7/2001 | Heyn | 264/252 |
| 7,041,246 B2 | * | 5/2006 | Fillmore | 264/154 |
| 7,568,590 B1 | * | 8/2009 | Gross et al. | 220/254.1 |

* cited by examiner

*Primary Examiner* — Edmund H. Lee
(74) *Attorney, Agent, or Firm* — Boyle Fredrickson, S.C.

(57) ABSTRACT

A storage means provides sealed storage for contents. A closure means is fused to a container by application of an electromagnetic field providing a permanent and hermetic seal between the closure and the container. The closure further includes a removable panel to provide access to the contents of the container.

11 Claims, 16 Drawing Sheets

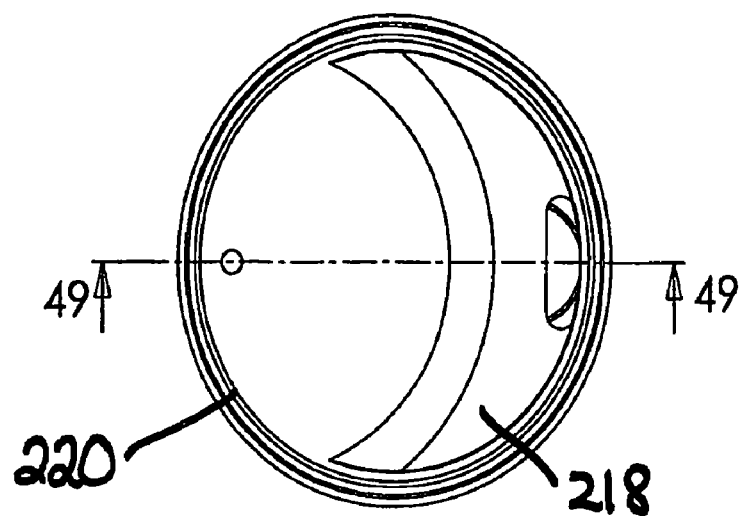
FIG. 48
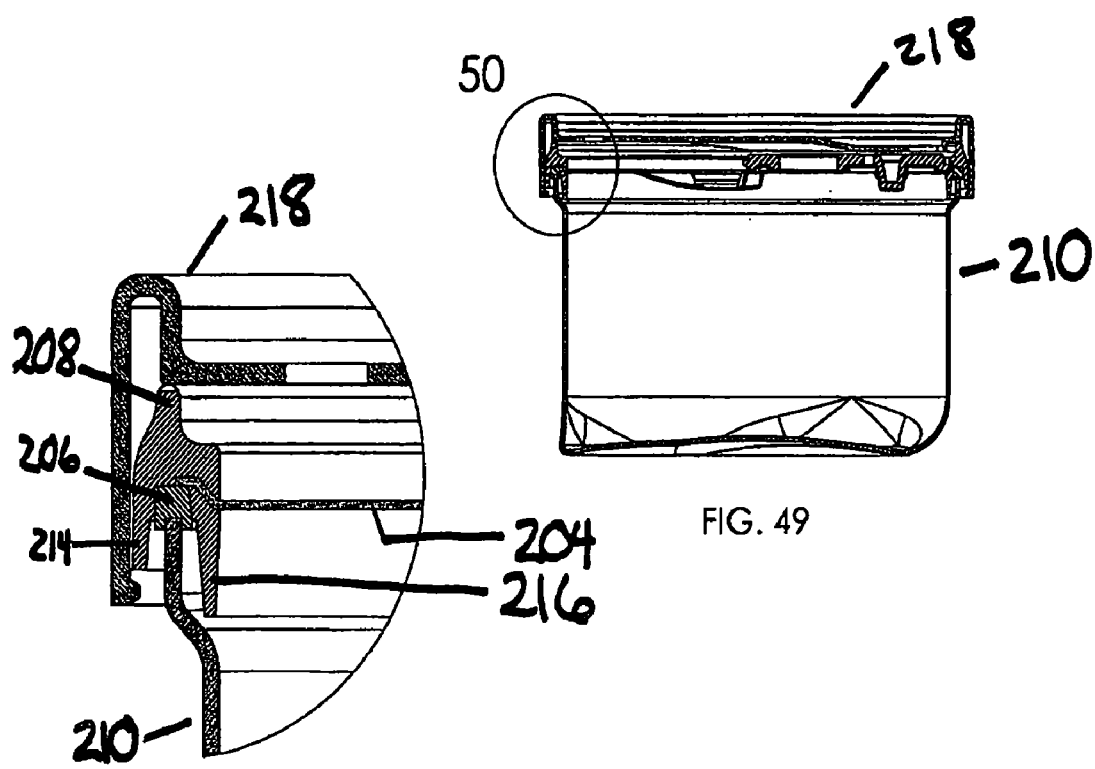
FIG. 49
FIG. 50

METHOD FOR MANUFACTURING A SEALABLE CONTAINER CLOSURE

CROSS REFERENCE TO RELATED APPLICATION

This application is a continuation of application Ser. No. 11/589,505 filed Oct. 30, 2006, now abandoned, which is a continuation of Ser. No. 10/642,923 filed Aug. 18, 2003, now abandoned, which claims priority from U.S. Provisional Application Ser. No. 60/404,227, filed Aug. 16, 2002.

BACKGROUND OF THE INVENTION

The present invention is generally related to providing protection for various products such as foods, drugs, chemicals including dry, semi-moist and wet products as well as products which contain particulate of varying sizes and shapes.

DESCRIPTION OF RELATED ART

The methods used to package and protect foods, drugs and chemicals today include cans, bottles, jars, laminated canisters, and pouches as well as semi-rigid plastic containers.

Additionally, most food, beverage and pharmaceutical products require more product protection that can be achieved by a single polymeric material. It is known that different combinations of materials can be used together to achieve desired protection in the areas of gas, moisture, chemical and thermal as well as physical properties that cannot be achieve economically by other means. In some instances desired properties can be achieved by a physical blend of various materials such as Dupont's Sclair™ films which are an alloy or blend of nylon and polyethylene used in the packaging of fluid milk and other food products. Recently, inorganic nano sized particles (1 billionth of a meter=nano) have been found to make significant improvements in the gas barrier properties of most polymers in which they are dispensed (JP 89308879.9). By themselves these alloys have been useful in providing some additional shelf life for refrigerated products or for products that are fairly tolerant of oxygen.

In some instances nano particles have been used in conjunction with oxygen scavengers to improve the gas barrier of the carrier polymer and provide a source of moisture for an anti-oxidant of oxygen scavenger that make up the alloy (JP 63281964). These blends containing both inorganic platelets to create a tortuous path and an oxygen scavenger are an improvement but do not, by themselves, provide the cost nor esthetics and continuing protection required for extended shelf life or shelf image of most oxygen intolerant, shelf stable foods.

For those critical packaging requirements the solution had been metal cans, or glass jars until the commercialization of semi-rigid, multi-layer, high-barrier plastics which occurred in earnest in the mid 1980's with the wide spread acceptance of such products as puddings, fruit compotes and single serve entrees. Previously, multi-layer, adhesive laminated, high-barrier thermoformed sheet technology had been used for small containers to package jams and jellies for single-serve, ready to use packs. These packs were produced based upon aqueous coating technology utilizing Poly-Vinylidene Chloride (PVDC). The PVDC coating, while very effective in a flat film form, is not capable of being stretch more that 10% without breaking apart. This prevents aqueous PVDC coatings from being used for larger sized or deeper packages. To over come extensibility problems, Dow Chemical Company developed an extrudable version and the method of combining it in a laminar method through a process known as coextrusion (U.S. Pat. No. 3,557,265).

Coextrusion was used in the creation of packages for both high and low acid foods with the first publicized application of "plastic cans" being thermally processed (retorted) in the mid-1970's by the Castleberry Food Company of Augusta, Ga. "Plastic cans" are prevalent today and the most common method of producing them is by a process known as solid-phase, pressure-forming. This process was developed in the early 1970's by the Shell Chemical Company in an effort to create sales opportunities for a newly commercialized plastic polymer known as polypropylene. Johnson in U.S. Pat. No. 3,546,746 taught us that we could thermoform plastic articles not only from flat sheet but also from pre-cut shape called billets or blanks. In U.S. Pat. No. 3,502,310 Coffman demonstrated how to improve the process by heating the billets continuously and forming several simultaneously.

The primary advantage of forming articles and specifically containers from pre-formed plastic billets did not become obvious until the mid 1980's when multi-layered plastic sheeting began to be used for the packaging and preserving of processed shelf stable foods. Plastic barrier containers have now become common and the primary methods of producing containers for shelf-stable applications are described below.

Adhesively laminated or coextruded sheet that is web or sheet fed through a radiant or contact heating oven and then thermoformed into its final shape by means of vacuum and or pressure with an additional assist from a movable plug to help distribute material for deep or tall containers, where required. Containers are then trimmed out of the web or sheet by trim tooling. Said trim tooling can either be a trim in place style which removes the part from the web as part of the forming process or, parts can be trimmed out of the web or sheet by a secondary (off-line) trimming process. Web scrap generated in this process typically exceeds 40% of the total web used in the process and is not uncommon to see scrap losses of 50% on round container shapes. This high scrap increases the cost of the finished parts as not all of the scrap will be able to be recovered and that portion that is recoverable is valued at the cost of the lowest priced material in the web as it's only real value is as a structural component. The benefit of the more expensive barrier materials are lost when the web skeleton is ground up to make regrind.

To maintain the barrier characteristics of the original individual layers or phases of the sheet the individual materials must maintain their individual integrity. Grinding the web skeleton into regrind destroys the integrity of the individual layers. The resulting blended materials when extruded into a sheet have none of the gas barrier characteristics of the original multilayered sheeting and in fact will have lost some of the physical properties of the initial structural material used in the original sheet manufacture. Additionally, some of the components in the original multilayered sheet were approved for indirect food contact only in high temperature food processing conditions. As these materials are no longer sandwiched into the center portion of the sheet, it is now necessary to place a separate food contact layer between the regrind component and the food product to insure that the materials, which are only acceptable for indirect food contact, are kept in that position.

In addition, if the initial multilayered sheet was clear, the use of regrind will diminish the clarity in direct proportion to the amount of regrind being used in the sheet. For containers which contain both polypropylene and EVOH (EVOH @ 3% or more) it has been commercially demonstrated that structures which incorporate web scrap of 15% or more are noticeably cloudy and at levels of 20% become unacceptable for most applications. The web skeleton that is not recovered and reused back into the manufacture of sheet is then sold of as waste with a salvage value less than half that of the reused regrind, further increasing the cost of the original parts produced from the web.

Reduced Scrap thermoforming has been developed to a commercial state in the U.S. by two patented methods the first being the Dow "Scrapless Forming Process" (U.S. Pat. No. 3,947,204) followed the Shell "Billet Forming Process" (U.S. Pat. Nos. 3,502,310; 3,546,746; 3,538,997). Both patents benefit from the process benefits described by Briston, et al., in PLASTICS IN CONTACT WITH FOODS, 466 pages, received in the PTO scientific library 12-31-74, as well as the process improvements for transporting the billets identified in Frados et al., PLASTICS ENGINEERING HANDBOOK, ISBN 0-442-22469-9, Library of Congress Catalog Card Number 75-26508 pages 315 & 316, describing the Hoffco/Beloit Forming System. The original Dow and Shell forming processes also benefited from Christine's et al., teachings in U.S. Pat. No. 3,538,997 which allows the individual transportation of the billets through the oven and into the forming station wherein the carrier becomes a central part of the forming tool. Once formed, the carrier tray transports the finished parts to the removal station and begins the cycle again. Parkinson, in U.S. Pat. No. 4,836,764, adapted this process.

Plastic containers used in the packaging of shelf stable foods required not only adequate barrier to prevent the oxidation of the products contained within but also had to prevent the gain or loss of moisture as well. As discussed, it is possible to design a multilayered package with the required barrier properties. However, the closures for these types of packages require a different approach or method so as to allow easy access to the product. Initially, metallic foils laminated and/or extrusion coated with polymeric thermal sealing compounds were developed to provide controllable seal strengths for ease of opening. In order to utilize these flexible-sealing membranes a sealing surface or flange had to be designed into the package. These sealing surfaces typically were flat although some exceptions were found to be workable such as that created by Embro in U.S. Pat. No. 4,282,699.

Metal can ends have also been used to seal these newer plastic containers with some success. However the can ends require that the plastic container have a flange, which is approximately 0.021" thick. As the starting thickness of the sheet is greater that 0.080" and can be as thick as 0.115". The plastic container flanges required that they be significantly reduced in thickness in order to meet the metal ends specifications. Reducing the sheet thickness by this much typically creates adhesion and other problems. Adhesion of the double seamable flange can cause operational problems if the problems are not caught before they appear on the production floor. Additionally the cut edge exposes the hydroscopic barrier materials to a high level of moisture pickup thereby diminishing it barrier properties.

Lastly, removable panels in metal can ends typically leave a sharp edge. To minimize this problem and resultant litigation, can ends have been developed which have additional folds over the top of the cut edge to make direct contact with the sharp surface difficult. This requires several additional steps in the manufacturing process and increases the number of rejects, which occur as a result of the increased metalworking. It has been found to be easier to use a metal end without the safety rim by putting a step or shoulder in the plastic containers so the can end is in immediate proximity to the upper, interior surface of the step or shoulder and slightly inboard of it as well. This creates a condition where it is again very difficult to contact the sharp surface of the metal end.

In another approach, the membranes are attached to premolded frames that are then affixed to the containers by several methods, an example of which is frictional or spin welding. This technique developed by Brown et al (U.S. Pat. No. 3,297,504) is in commercial use. A major problem with spin welding is that it is subject to moisture or other contamination at the interface where the separate parts of the container are to be joined. These contaminates can act as a lubricant preventing sufficient heat from developing to create the welded joint or they can prevent a complete intermixing of the two surfaces from taking place. Additionally, the weld, which results, is highly oriented in the direction of the spinning component or container half. This creates an impact or notch sensitivity/weakness in the transverse or opposite direction, making the integrity of the weld subject to impacts in the transverse direction. Additionally, spin welding is restricted to round containers or mating surfaces.

SUMMARY OF THE INVENTION

A sealable storage container is provided which includes a container having an upper edge, sides and a bottom or open end. A closure for the container has a frame, a cover panel which is at least partially removable and a means for bonding the closure to the upper top edge of the container, or, if the container has two open ends, a closure can be used on both ends. The frame is preferably made from a plastic such as a thermoplastic polymeric material although other materials may be appropriate depending on the desired use. Preferably, the closure includes a structure to facilitate the placement of the closure on the container, such as a pair of downwardly extending legs which form a channel into which the upper edge (or both edges) is inserted. The closure may further include an upwardly extending peripheral rim which accepts the bottom of one of the plurality of storage containers to aid in stacking a plurality of the storage containers. The cover panel portion of the closure is a panel which can either be flexible or substantially rigid and is preferably made from a thermoplastic material. The cover panel can be releasably bonded to the closure frame or can be permanently bonded but designed such that an interior portion can be removed. Opposing pre-scored cuts, offset pre-scored cuts or aligned, pre-scored cuts can be made in the cover panel to remove just a portion of the cover panel. The preferred embodiment includes a structure for removing the cover panel or a portion there of in the form of a grip. This grip can be a pull tab which extends from the cover panel, a ring pull which is attached to the surface of the cover panel or other appropriate structure. The closure is bonded to the container preferably by means of a fusion ring which becomes molten when heated by, for example, the non-contact application of an electromagnetic field.

The closure is manufactured by an injection molding process. A membrane, which forms the cover panel discussed previously, includes a peelable coating on one side. The membrane is placed into a first mold section which is mated with a second mold section to form a cavity area. A thermoplastic polymeric material is injected into the cavity area to form a frame when the cavity is filled, also causing the peelable coating on the membrane to bond to the frame. A third mold section replaces the second and a fusible polymeric material is injected into the third mold section to form a fusible ring, thus completing the closure. Alternatively, first and second mold sections may be used to form a fusible ring which has a shelf. The first mold section is removed and the cover panel is placed on the shelf of the fusible ring. A third mold section is mated with the first mold section and a thermoplastic polymeric material is injected to form a frame, thus completing the closure.

The fusible polymeric material is preferably an electromagnetic material and may also be an oxygen scavenger. If desired, the thermoplastic polymeric material may includes one or more of the following compounds: fumed silica, glass micro-spheres, talc, nano-clay, mica, calcium carbonate, iron powder, nylon, and EVOH.

BRIEF DESCRIPTION OF THE DRAWINGS

FIG. 48 is a top plan view showing the closure on the container with an optional, removable overcap snapped onto and covering the closure.

FIG. 49 is a sectional view taken at line 49-49 of FIG. 49.

FIG. 50 is an enlarged fragmentary area of FIG. 49 at circle 50 showing the relation of the overcap to the closure and the container.

ELEMENT LIST

Figure 1:
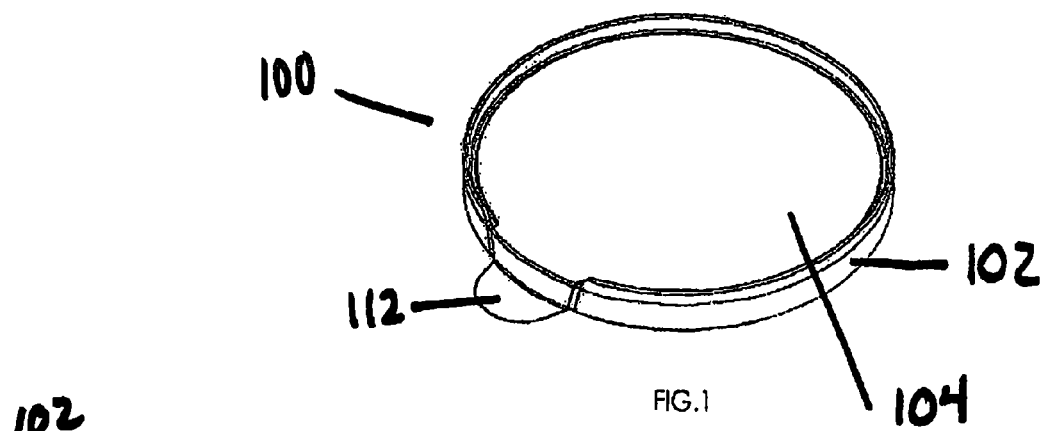
FIG. 1 is an isometric view of the container closure with the peel-away membrane seal.
Figure 2:
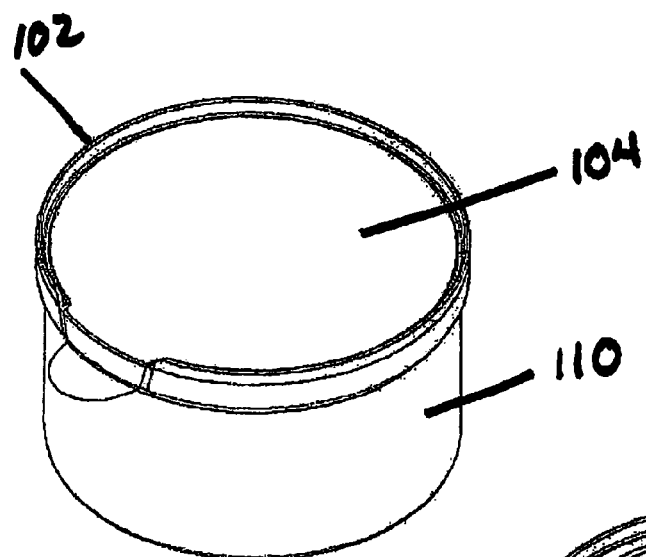
FIG. 2 is an isometric view of the package which consists of a can, shaped container and the container closure, with the peel-away membrane attached, fused to the container.
Figure 3:
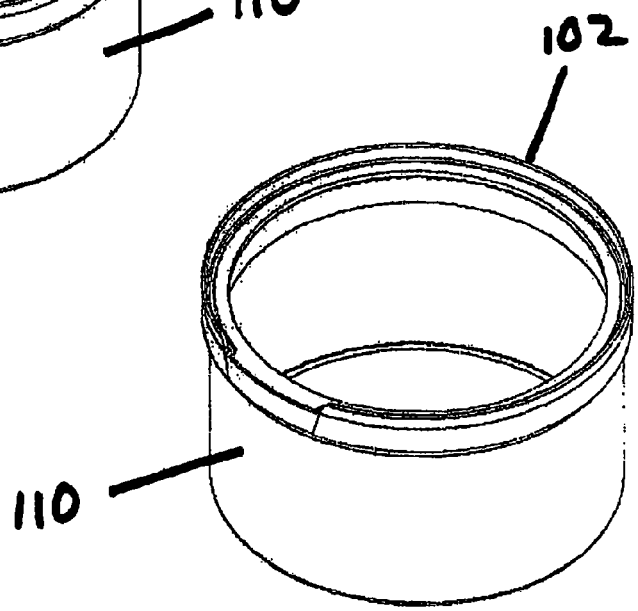
FIG. 3 is an isometric view of the package with the peel-away membrane of the container closure removed.
Figure 4:
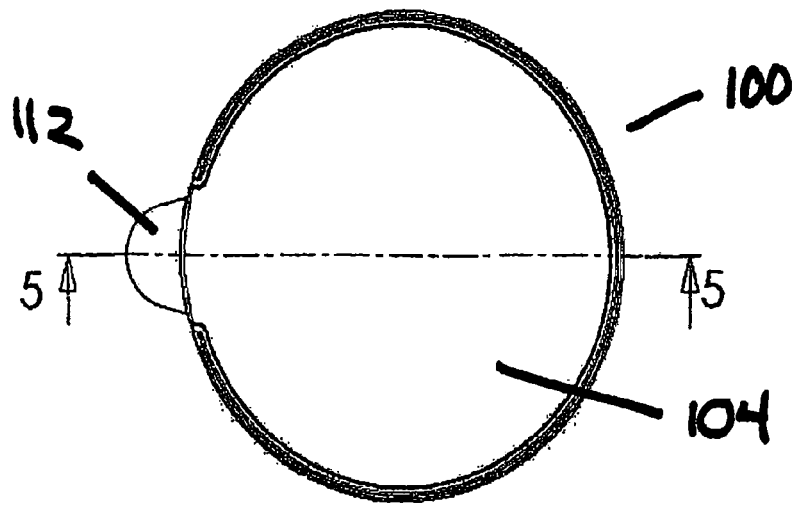
FIG. 4 is a top plan view of the container closure with the peel-away membrane seal.

100 closure
102 frame
104 peel-away membrane
106 fusion ring
108 rim
110 container
112 pull-tab
114 outer leg
116 inner leg
200 closure
202 frame
204 plastic panel
206 fusion ring
208 rim
210 container
212 ring-pull
214 outer leg
216 inner leg
218 overcap

DETAILED DESCRIPTION OF THE PREFERRED EMBODIMENT OF THE INVENTION

The following is a detailed description of the preferred embodiment of the invention. It is important to note that the invention is not limited to the shapes, sizes and proportions shown in the figures and discussed in the following description. Even though the embodiments shown and discussed are in the form of round or cylindrical packages and package components, it is anticipated that other shapes such as square, rectangular, oval, triangular, and polygonal, etc. could be used. Further, while the description below describes a container with a single opening, a container with openings at both ends is also contemplated. Likewise it is anticipated that other features of the design, such as the ring-pull or the pull-tab could also have a multitude of shapes, sizes and proportions. The preformed containers shown in use with these two closure embodiments are not restrictive to the specific embodiment with which they are associated in the figures. For example, the container shown in the first embodiment could also be used with the closure of the second embodiment and vice versa.

This invention seeks to replace the more energy intensive packages with packages which provide the same relative amount of product protection while consuming much less energy in their comparative total life cycle. Additionally, the package seeks to provide improvements or benefits not possible with current forms of packaging. These improvements relate both to the manufacturing processes as well as more use-oriented benefits. While it may be possible to obtain packages which contain one or more of these improvements or benefits, our system is the first to offer all of these benefits to the manufacturer and/or consumer at one time, in a cost effective manner.

The present invention is not material specific. It is based upon the interface of the closure and the container along with the manufacturing method, which includes multi-shot injection molding with either an insert molding step or the application of a heat-sealed membrane onto one surface of the mold prior to the injection of a polymeric material, which makes up the frame. Upon injection of the polymeric frame material the inserted closure component (break-away, pull-out panel or peel-away membrane) is bonded to the frame in a controlled condition. For the breakaway panel the bond where the panel meets the frame is inseparable. The bond that is developed with the peelable membrane is controllable and can be developed to predetermined peel strength. The equipment which allows these steps to be performed includes large rotary turntable injection molding systems as produced and sold by PHF/Trueblood of Columbus, Ohio and others as well as the patented (WIPO # WO 00/73040 A1) Gram (Spin-Stack) co-injection/insert tooling technology.

To be considered as possible replacements for traditional metal, double seamed ends, it is necessary for plastic closures to provide the same product protection, food process compatibility and ease of container access offered by traditional closures. Today, using the molding technologies identified above, it is possible to produce all-plastic closures that meet the minimum criteria established by the traditional closures. Both the rotary turntable molding process and the spin-stack technology will allow multiple materials (frame and adhesive ring) to be co-injection molded in conjunction with insert molding (pull-out panel or peelable membrane) and/or heat-sealing of a membrane onto the upper surface of the molded part while it is still retained in the injection molding tooling.

Combining these normally separate processes has some very specific advantages over separate manufacturing steps, which include:

Improved repeatability and consistency in the seal strength of flexible membranes bonded to the sealing surface of the frame;

The ability to pre-treat plastic pullout panels which would not be commercially viable in the final molded part. These pretreatments would include but not be limited to:

Pre-forming to accommodate container, closure or consumer needs,

Pre-printing,

Pre-coating with a release agent to allow over-molding of one or more plastic materials of a similar type over another with out bonding, or Pre-scoring of the tear notch; and Utilizing coextruded multi-layered plastic sheeting to achieve the desired combination of barrier and physical properties required by the product or commercial sterilization process. Previous patents, which identify insert molding of barrier materials (U.S. Pat. Nos. 5,114,507; 6,258,312 B1; 5,697,514; 5,950,861 refer to laminated materials. The process of lamination requires that two or more materials be produced and physically bonded together. This process increases the manufacturing cost by requiring several separate steps as opposed to coextrusion, which requires only one. Additionally, our preferred material will include one or more foamed polypropylene layers which utilize the now abandoned patent identified in GB Pat No. 2 263 435 A.

This capability to mold multiple materials (in addition to insert molding and in-mold heat-sealing) allows for plastic ends to be developed which can be designed to provide adequate keeping properties in terms of gas and moisture barriers. Additionally, the closures can be designed to thermally weld to the contacted surfaces of the container by the use of ultra-sonic or electro-magnetic heating of the fusion bonding system. Heating of the bonding system by either of these means will raise the temperature of the fusion bonding material and the materials it contacts to their fusion temperature. Once this temperature is achieved the similar materials contained in both the container and the closure exchange molecules at the interface of these adjacent articles to be joined and a thermal/fusion weld is made. The preferred process of induction is not new but previously had required the insertion of electro-magnetically excitable or conductive materials such as wire, metal foil or a metal-powder filled gasket or liquid adhesive between the parts to be welded (U.S. Pat. Nos. 5,114,507; 6,258,312; 3,620,875; 3,620,876; 4,201,306).

The electromagnetic and/or conductive materials that may used in our fusion ring may include powders of stainless steel, tin oxide, iron, carbon black, carbonaceous or other materials. The preferred material will include iron powder similar to those described in expired U.S. Pat. Nos. 3,620,876 and 3,620,875 except that any and all materials will be required to be acceptable for direct food contact by the U.S. Food and Drug Administration when the fusionable ring is to be used in a package containing human or non-human food. The preferred materials which meet this criteria include both a sponge iron powder (FG 100) as manufactured by the Hoeganaes Company, Inc of Ramsey, N.J. or a carbonyl iron powder (Ferronyl) as produced by ISP Technologies Inc. of Freehold, N.J. or other similar food grade iron powders.

An additional benefit of iron powder is that in the presence of moisture and air, iron powder is an effective oxygen scavenger. As a result of our multi-material molding process where iron powder is used, it will be molded and stored in a dry condition. However, when the fusion ring is activated as a result of hot filling of wet food products into the container or by the thermal pasteurization or retorting (autoclaving), this activation will occur with the fusion ring in the presence of moisture or high relative humidity. Activation of the ring occurs when the temperature of the ring rises to a point (above 140° F.) where moisture vapor is allowed to enter and pass through the molecular free space within the polymer making up the matrix of the fusion ring. This water vapor is then absorbed by inorganic fillers and/or pigments contained in the polymer. These inorganic fillers and pigments are in direct and indirect contact with the iron powder and as such provide the moisture necessary to activate the oxygen scavenging capabilities of the iron powder and/or iron oxide, providing the final component in the iron scavenging process. As the polymer in the fusion ring cools, the moisture contained within the fusion ring is trapped, providing a source of moisture required for the oxygen scavenging process.

Oxygen which permeates through polypropylene at the average rate of 150 cc's/mil/100 sq"/24 hrs @ 73° F. @75% RH, is blocked by the use of gas barrier materials in both the pullout or the peel-able membrane inserts of the closure. A similar barrier material is contained within the coextruded material that makes up the container body. That portion of the closure that makes up the frame has minimal gas barrier capability. To enhance its gas barrier potential, inorganic fillers such as fumed silica, glass micro-spheres, mica, and talc as well as nano particles of clay or barrier polymers themselves are added to polymeric frame material to create a torturous path that provides the same benefit as significantly increasing the thickness of the frame member. While the addition of one or more of those components will make a significant improvement in the gas barrier and specifically the oxygen barrier potential of the frame it is not enough. To supplement the improved gas barrier of the frame member, an oxygen scavenger is included in the fusion ring that runs between the frame member and the peel-able or pull-out barrier inserts and also is exposed directly to the headspace area inside of the sealed container. The placement of the oxygen scavenger effectively eliminates the ingress of oxygen from the frame and also consumes oxygen that is available within the headspace of the container as a result of air being carried into the pack during the filling operation.

The purpose of using iron powder as an oxygen scavenger by itself or in combination with other electro-magnetic or conductive additives is to:

Reduce or eliminate oxygen from the headspace of the container, and

Minimize the ingress of oxygen into the container in areas not protected by barrier polymers such as EVOH, nylon, MDX6 nylon or Poly-Vinylidene Chloride (PVDC), Liquid Crystal Polymers, Polyester, and Acrylonitrile based or other barrier materials.

Containers may be made of polymeric materials typically used for packaging and would included polyethylene, polystyrene, polypropylene, polyester, polycarbonate, acrylonitrile-butydene-styrene, acrylic-terpolymers, nylon or polyvinyl-chloride as well as other materials used in the manufacture of packages.

Figure 5:
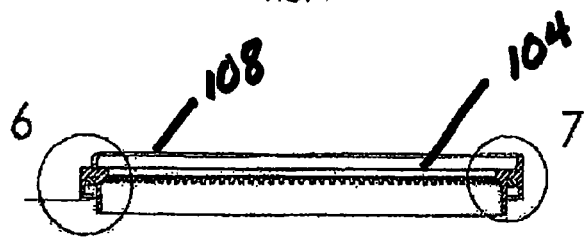
FIG. 5 is a sectional view of the container closure with the peel-away membrane seal taken at line 5-5 of FIG. 4.
Figures 6, 7:
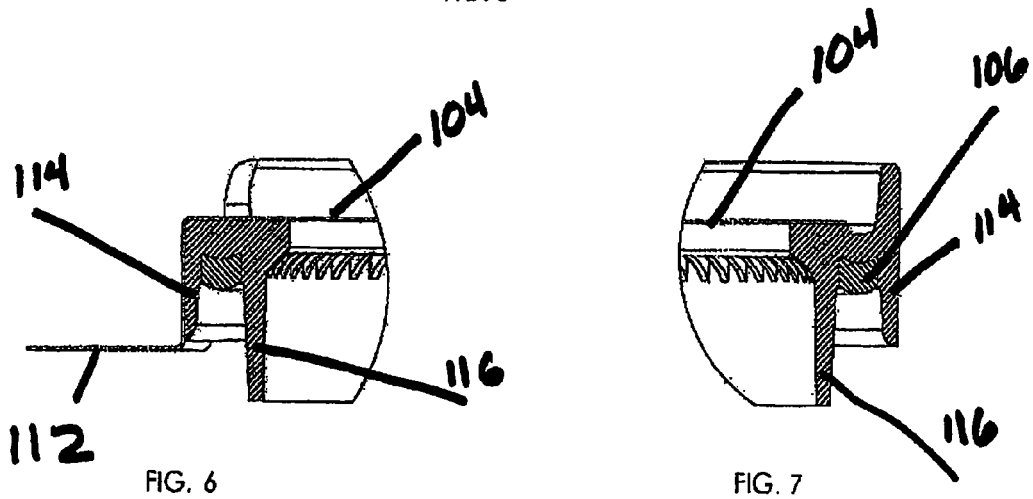
FIG. 6 is an enlarged fragmentary area of FIG. 5 at circle 6 showing the manner in which the membrane pull-tab is fixed to the side of the frame.
FIG. 7 is an enlarged fragmentary area of FIG. 5 at circle 7 showing the fusion ring in relation to the frame and the peel-away membrane.
Figure 10:
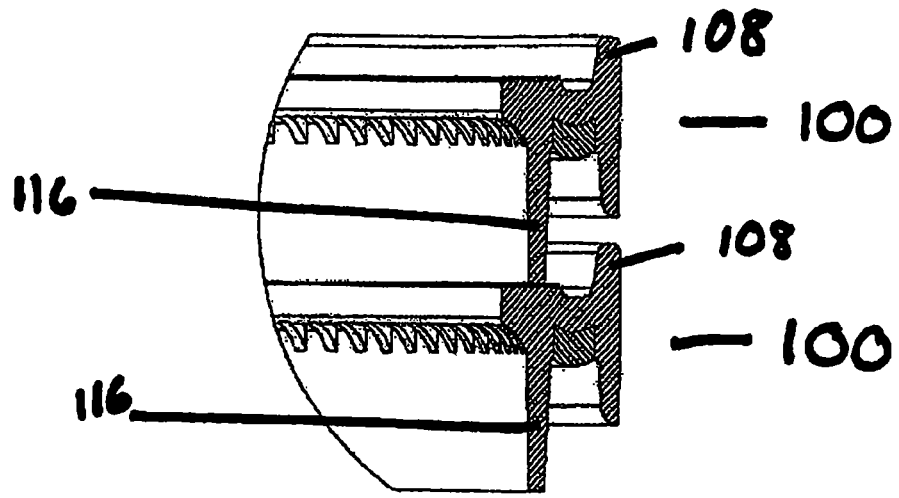
FIG. 10 is an enlarged fragmentary area of FIG. 9 at circle 10.
Figure 9:
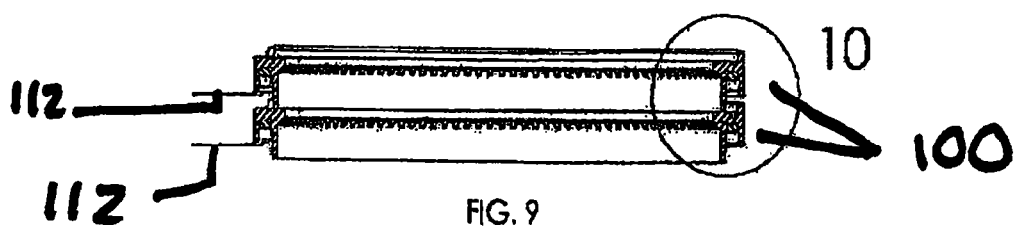
FIG. 9 is a sectional view taken at line 9-9 of FIG. 8 showing the manner in which the container closure with the peel-away membrane seal can be stacked for rapid and reliable dispensing onto containers prior to heating the fusion ring.
Figure 8:
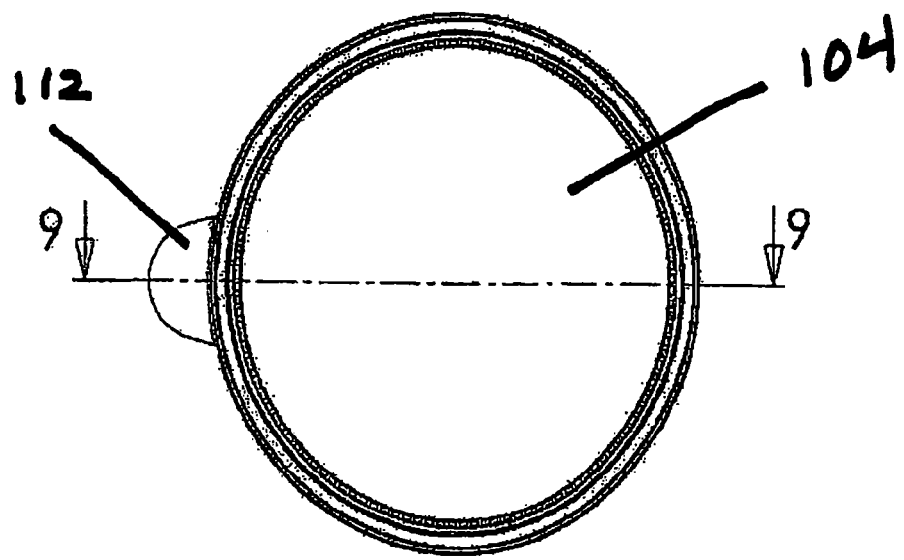
FIG. 8 is a bottom plan view of one container closure with the peel-away membrane seal stacked on another container closure with the peel-away membrane seal.
Figure 11:
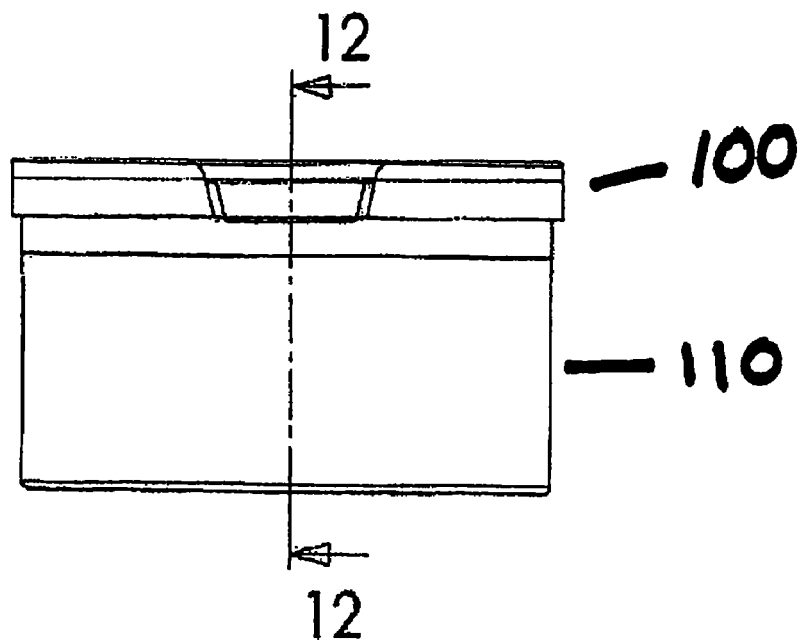
FIG. 11 is an elevated view of the can shaped container with the container closure above the container prior to the placement of the closure on the container.
Figure 12:
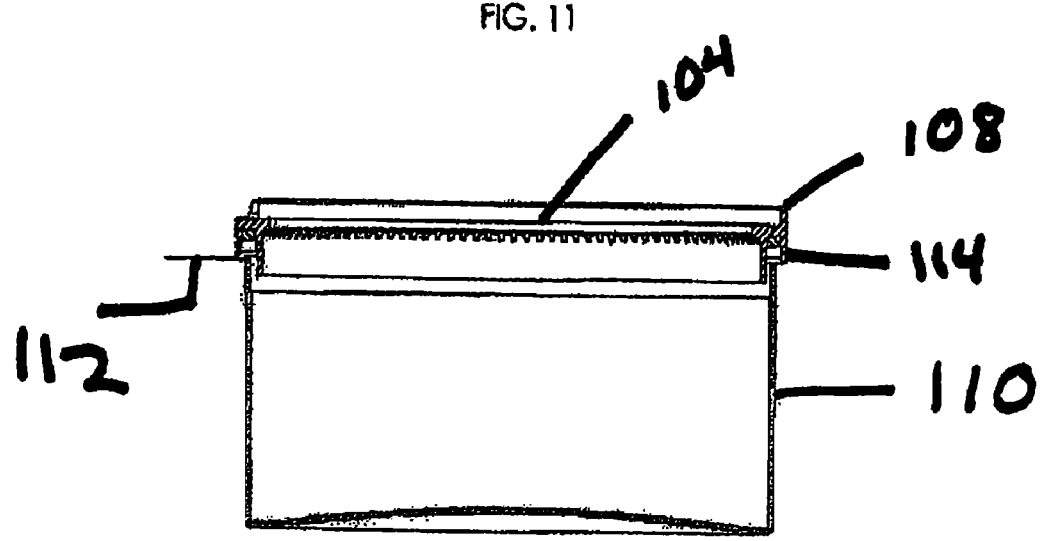
FIG. 12 is a sectional view taken at line 12-12 of FIG. 11 showing the manner in which the extended inner leg of the closure guides the frame to a correct position for proper fusion to the container body.
Figure 13:
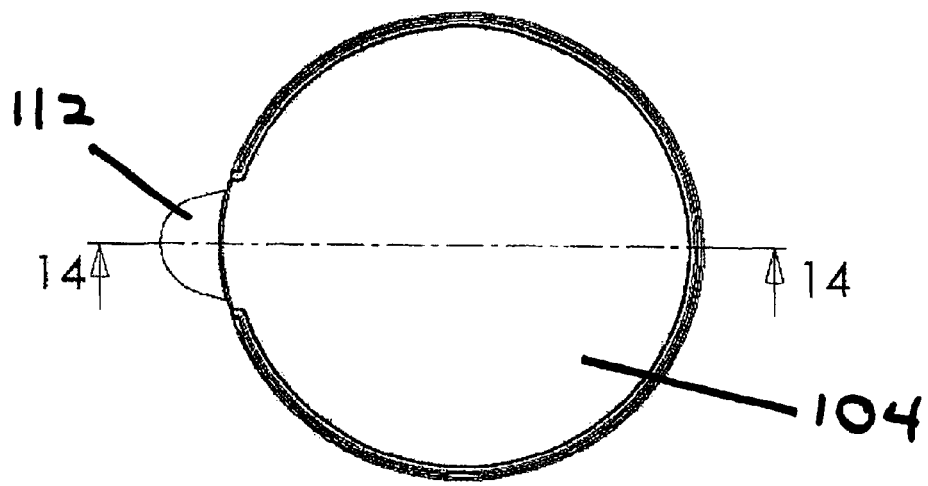
FIG. 13 is a top plan view of the container closure with the peel-away membrane seal assembled to a can shaped container.
Figure 14:
FIG. 14 is a sectional view taken at line 14-14 of FIG. 13.
Figure 15:
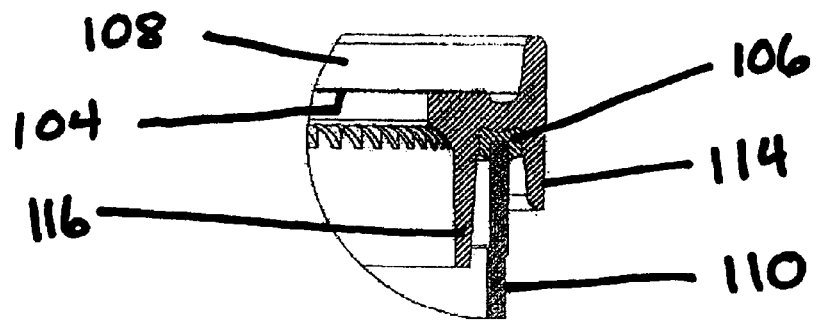
FIG. 15 is an enlarged fragmentary area of FIG. 14 at circle 15 after the container's flangeless sidewall is embedded into the fusion ring and shows the fusion ring in relation to the embedded container section.
Figure 16:
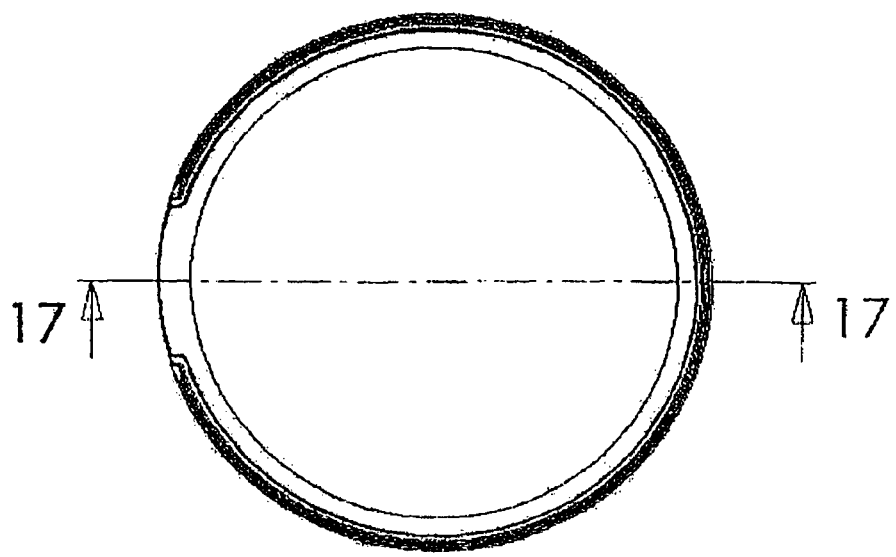
FIG. 16 is a top plan view showing the closure on the container after the peel-away membrane has been removed.
Figure 17:
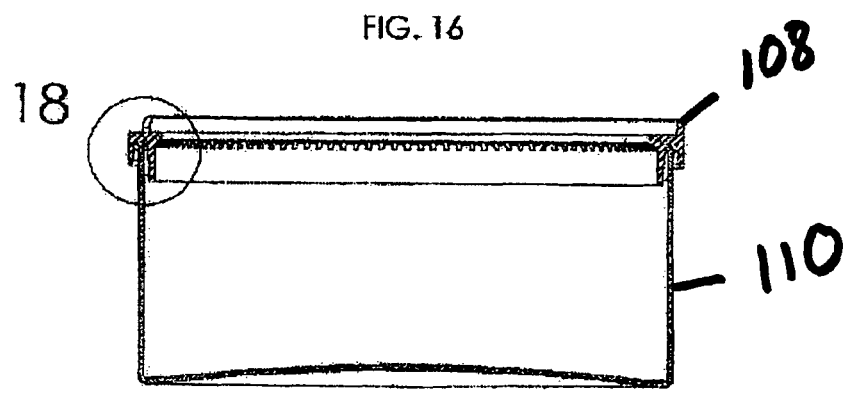
FIG. 17 is a sectional view taken at line 17-17 of FIG. 16.
Figure 18:
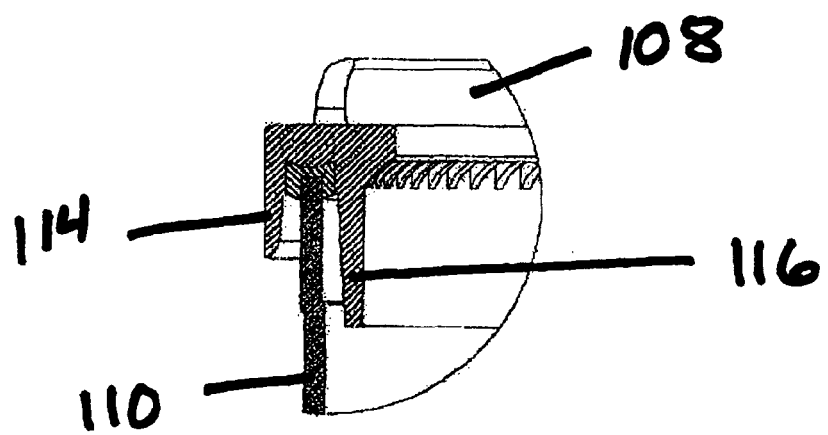
FIG. 18 is an enlarged fragmentary area of FIG. 17 at circle 18 showing the area where the membrane pull-tab had been affixed to the sidewall of the frame prior to the removal of the membrane.
Figure 19:
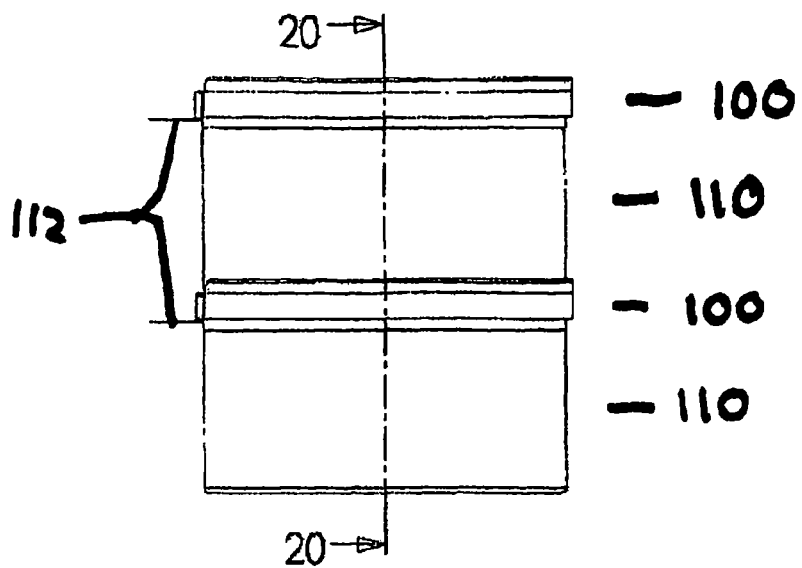
FIG. 19 is an elevated view showing the stacking of one package on another package.
Figure 20:
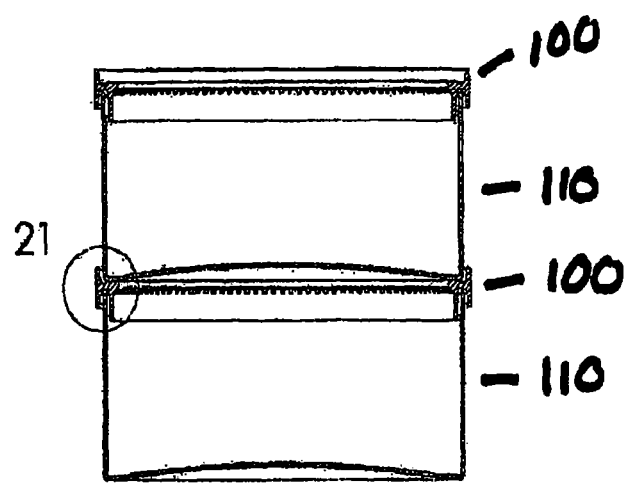
FIG. 20 is a sectional view taken at line 20-20 of FIG. 19 showing the manner in which the bottom of the container above nests into and on top of the frame of the container below.
Figure 21:
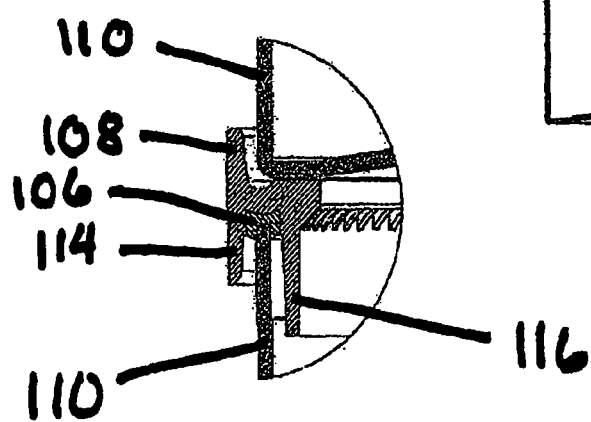
FIG. 21 is an enlarged fragmentary area of FIG. 20 at circle 21.

The first embodiment (FIGS. 1-21) of the closure 100, shown generally in FIGS. 1-4, consists of a frame 102 made from a thermoplastic polymeric material, a pre-treated, multi-layered, semi-flexible, high-barrier plastic peel-away membrane 104 and a fusion ring 106 (see FIGS. 5-7) made from an electro-magnetic, polymeric, fusible material suitable for bi-injection molding. These three components of the closure 100 have features, which in combination, offer unique functional and handling characteristics. The frame 102 includes a platform with a surface area for the releasable bonding of the membrane 104. Outside and extending above this platform is a rim 108. In combination, the rim 108 and platform serve to provide a means for the controlled stacking of the closures 100 one on top of the other (as shown in FIGS. 8-10) for improved handling prior to the closure 100 being placed on the container 110. This combination also serves to provide a "nest" area for the controlled stacking of one package on top of the other with the bottom of the container 110 sitting on the portion of the membrane 104 immediately above the platform of the frame 102 and is controlled from lateral movement by the relationship of the outside surface of the container 220 being contained within the inner surface of the rim 108 (as shown in FIGS. 19-21). This rim 108 has an opening through which the pull-tab 112 feature of the membrane 104 passes. The pull-tab 112 bends downward and is releasably bonded to the sidewall of the frame 102 (as shown in FIG. 6).

Below the frame 102 platform is a channel containing the fusion ring 106. Outward and inward of this channel and extending downward are legs 114 & 116. The inner leg 116 is of sufficient length to contain within the inner surface any melted residue from the fusion ring 106 as the closure 100 is bonded to the container 110 in order to minimize contact between the product and the electro-magnetic, polymeric, fusible material of the fusion ring 106. The outer leg 114 may be shorter, the same length or longer than the inner leg 116 depending on aesthetic and any additional functional requirements such as during the closure 100 application to the container 110. These legs 114 & 116 are the primary means for providing an accurate location and placement of the closure 100 on the upper flangeless rim of the container 110 on a high speed filling line. During application (after the container 110 is filled), the closure 100 is positioned above the moving container 110 in a feeder trough and is dropped onto the top of the container 110. These legs 114 & 116 guide the closure 100 onto the rim 108 of the container 110 until the top surface of the container 110 contacts the bottom-exposed surface of the fusion ring 106. If the outer leg 114 were longer than the inner leg 116 then the closure 100 could be presented to the container 110 at an angle. As the closure 100 is lowered, the outer leg 114 catches onto the rim 108 of the moving container 110, extracting it from the feeder trough and guiding it into place on top of the container rim 108.

Once the closure 100 is placed on top of the container 110, there is contact between the top surface of the container rim 108 and the exposed bottom surface of the fusion ring 106. The fusion ring 106 is then exposed to an electro-magnetic field while a downward force is applied to the closure 100. As shown in FIGS. 11-15, the closure 100 is thus permanently and hermetically fused to the opening of the flangeless container 110 by the heating of the fusion ring 106 to a semi-molten state by the non-contact, electro-magnetic excitement of the metallic and/or carbonaceous fillers contained within the fusion ring 106 and embedding the upper portion of the flangeless container 110 into the semi-molten fusion ring 106. Once the closure 100 is fused to the container 110, the only means to get to the contents of the container 110 is by the removal of the peel-away membrane 104. The preferred and intended method for the removal of the membrane 104 from the filled package is to grasp the pull tab portion 112 of the membrane 104 pulling it upward and away from the package and thus separating the membrane 104 from the frame 102 of the closure 100 (see FIGS. 16-18).

The membrane 104 is manufactured prior to the manufacture of the frame 102 and the fusion ring 106 components of the closure 100. This membrane 104 has desired gas, moisture barrier and physical properties required by the product or commercial sterilization process of the package. This membrane 104 also has printed or coated on one side a release agent in an area that will contact the frame 102. Generally this membrane 104 is die cut from a sheet in a shape to match the corresponding shape of the frame 102, and with a pull-tab extension 112, prior to it being inserted into the mold.

The membrane may be a semi-flexible, multi-layered high-barrier, all plastic membrane formed by coextrusion wherein all layers are simultaneously extruded in a laminar fashion through a common sizing die, and then cooled and rolled or sheeted in preparation for the next procedure. The membrane may further include a food contact surface made of a polymeric material generally recognized as safe for food contact at use temperatures which range between 145° F. to 265° F., by the appropriate U.S. regulatory agencies and all other materials being recognized as safe for indirect contact at the temperatures specified. Other individual and discreet layers or phases of each material are simultaneously coextruded through a common die with each separate layer providing a specific benefit to the final closure and complete package. The layers could include an polymeric oxygen/gas barrier such as PVDC, MDX6 Nylon, Nylon, EVOH, PAN or liquid crystal polymers or blends there of. In addition, the gas barrier materials may contain inorganic fillers to enhance their barrier and or physical properties. On either side of the gas barrier layer will be compatibilizing polymers used to minimize the flow related problems associated with coextrusion and at the same time aid in bonding the gas barrier material to the materials on either side. It is expected that the material outboard of the compatibilizing or adhesive layer will be made up of a common packaging resin such as polyethylene, polystyrene or polypropylene and that those materials may be foamed to reduce weight and cost of the semi-flexible lidding material.

The process for the manufacture of the closure 100 is as follows. The first mold section, which includes features to form the top side of the frame 102, receives the die cut peel-away membrane 104 in such a manner that the pre-printed release agent coating faces outward or away from the mold surfaces and is positioned so that the pull tab portion 112 of the membrane 104 extends through and beyond the molding surfaces which will form the opening in the rim 108 feature of the frame 102. The membrane 104 can be held and retained in position by a variety of methods including, but not limited to, vacuum, a "tacky" substance applied to the contact surface of the membrane 104 or the mold section, or a slight undercut in the mold. The first mold section containing the membrane 104 then mates with a second mold section forming a cavity area for the molding of the frame 102. The release agent coated area of the membrane 104 becomes a portion of the molding surface for the frame 102. As the frame 102 is molded, a releasable bond with the coated area of the membrane 104 is created. The second mold section is then replaced with a third mold section which, in conjunction with the frame, forms a channel for the molding of the fusion ring 106. Once the fusion ring 106 is molded, the closure 100 is released, ejected or removed from the mold.

Figure 22:
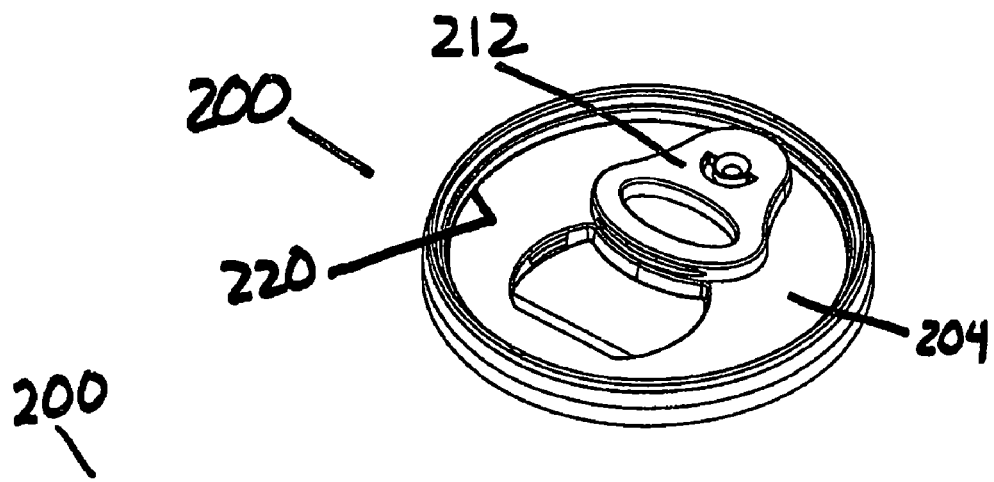
FIG. 22 is an isometric view of the container closure with the breakaway pullout panel and the lever acting ring-pull device.
Figure 23:
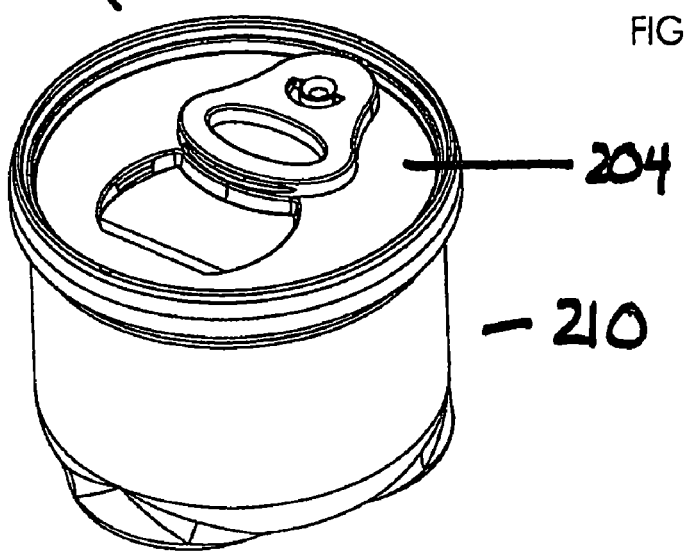
FIG. 23 is an isometric view of the package, which consists of a bowl, shaped container and the container closure, with the breakaway pullout panel and the lever acting ring-pull device, fused to the container.
Figure 24:
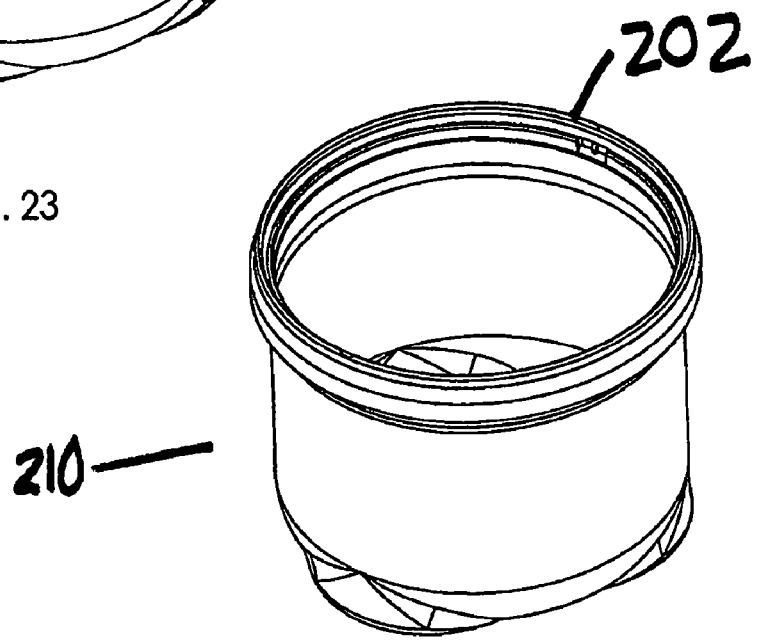
FIG. 24 is an isometric view of the package with the breakaway pullout panel and the lever acting ring-pull device of the container closure removed.
Figure 25:
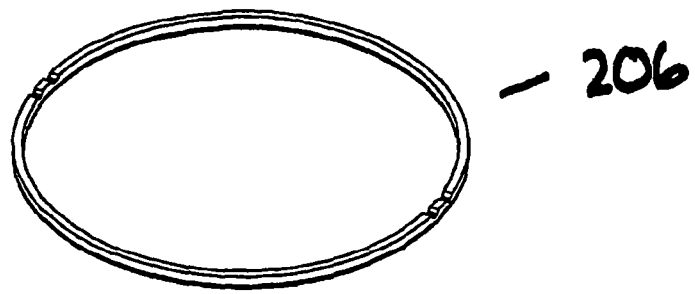
FIG. 25 is an isometric view of the fusion ring showing the support shelf for the pullout panel with a series of channels to allow for the easy transport through and around the fusion ring of injected polymeric material that makes up the frame and ring-pull features.
Figure 26:
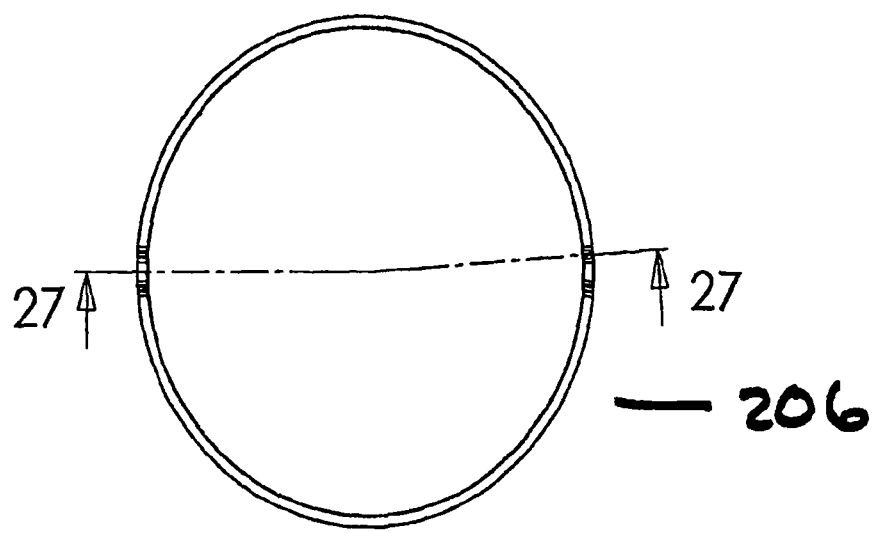
FIG. 26 is a top plan view of the fusion ring.
Figure 27:
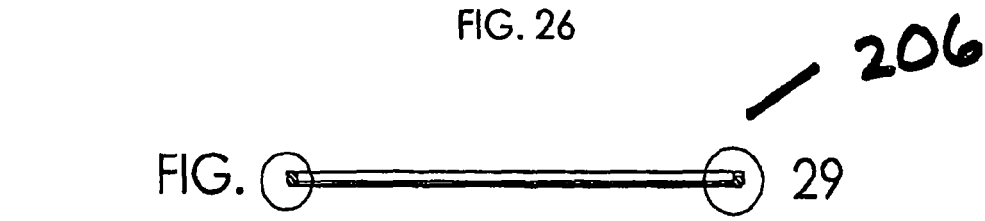
FIG. 27 is a sectional view taken at line 27-27 of FIG. 26.
Figure 28:
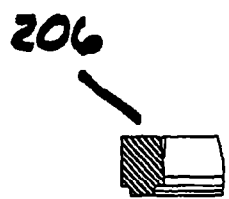
FIG. 28 is an enlarged fragmentary area of FIG. 27 at circle 28 showing the support shelf portion of the fusion ring.
Figure 29:
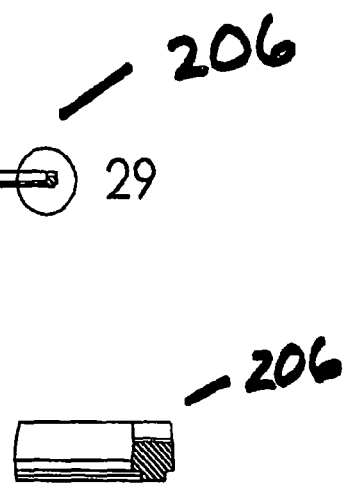
FIG. 29 is an enlarged fragmentary area of FIG. 27 at circle 29 showing the channel portion of the fusion ring.
Figure 30:
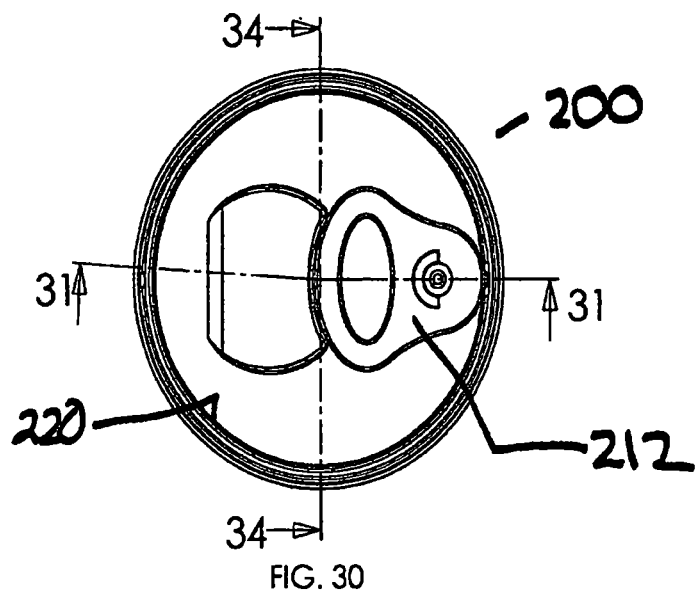
FIG. 30 is a top plan view of container closure with the breakaway pullout panel and the lever acting ring-pull device.
Figure 31:
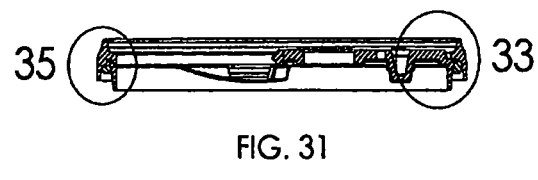
FIG. 31 is a sectional view taken at line 31-31 of FIG. 30.
Figure 32:
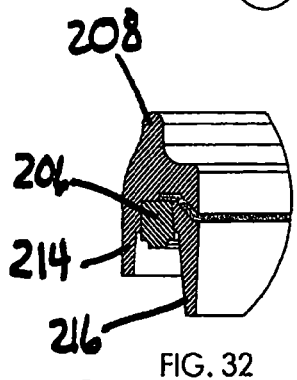
FIG. 32 is an enlarged fragmentary area of FIG. 31 at circle 32 showing the cut view of the fusion ring at the support shelf and the relation to the frame and the breakaway panel insert.
Figure 33:
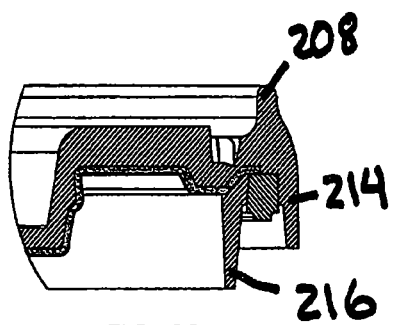
FIG. 33 is an enlarged fragmentary area of FIG. 31 at circle 33 showing the cut view of the fusion ring, the frame, the breakaway panel insert and the pull tab lever at the frangible attachment of the pull tab lever to the frame.
Figure 35:
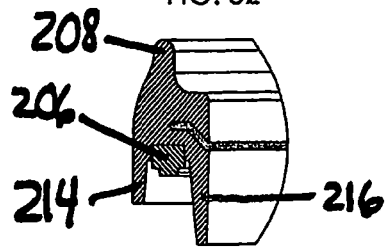
FIG. 35 is an enlarged fragmentary area of FIG. 34 at circle 35 showing the cut view of the fusion ring at the channel and the relation to the frame and the breakaway panel insert.
Figure 34:
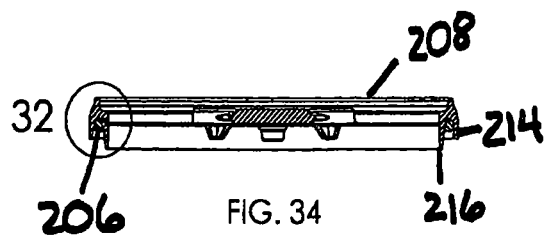
FIG. 34 is a sectional view taken at line 34-34 of FIG. 30.
Figure 38:
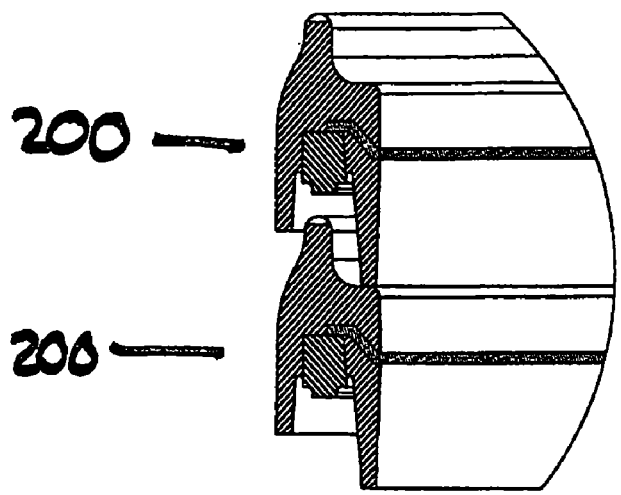
FIG. 38 is an enlarged fragmentary area of FIG. 37 at circle 38.
Figure 37:
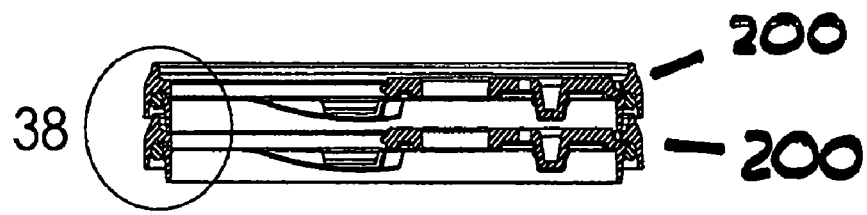
FIG. 37 is a sectional view taken at line 37-37 of FIG. 36 showing the manner in which the container closures can be stacked for rapid and reliable dispensing onto containers prior to heating the fusion ring.
Figure 36:
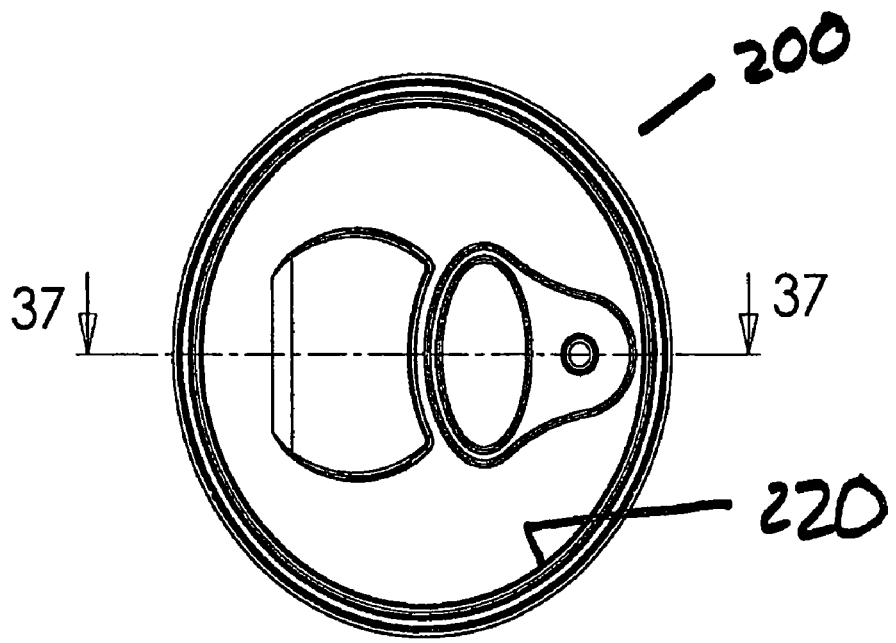
FIG. 36 is a bottom plan view of one container closure stacked on another container closure.
Figure 39:
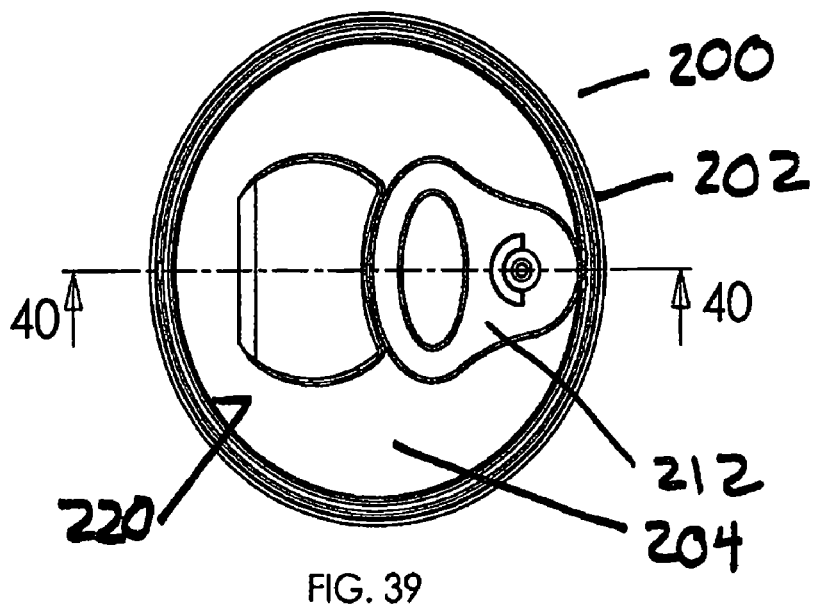
FIG. 39 is a top plan view of the container closure assembled to a bowl shaped container.
Figure 40:
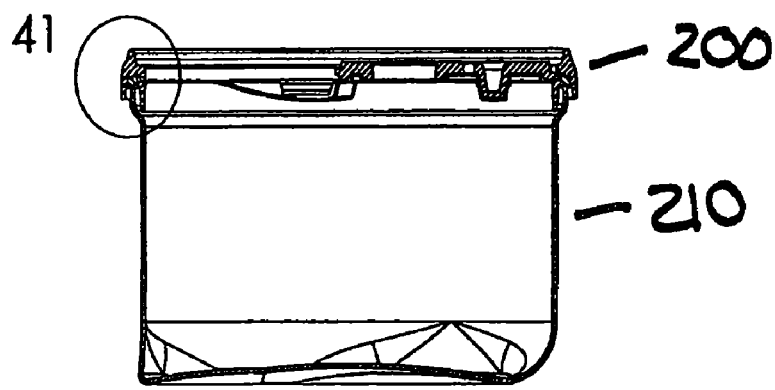
FIG. 40 is a sectional view taken at line 40-40 of FIG. 39.
Figure 41:
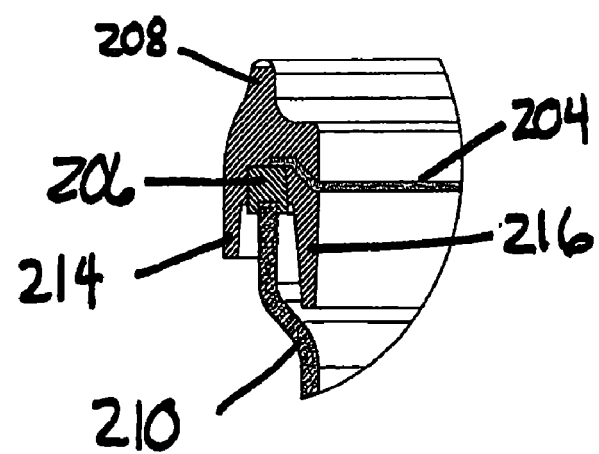
FIG. 41 is an enlarged fragmentary area of FIG. 40 at circle 41 after the container's flangeless sidewall is embedded into the fusion ring, showing the fusion ring in relation to the embedded container section and the relation of the extended inner leg of the closure to the upper stepped out wall portion of the container.
Figure 42:
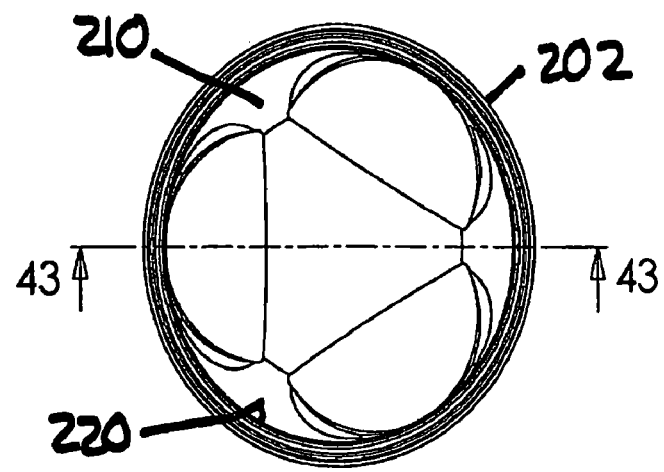
FIG. 42 is a top plan view showing the closure on the container after the pullout panel and the ring-pull device have been removed.
Figure 43:
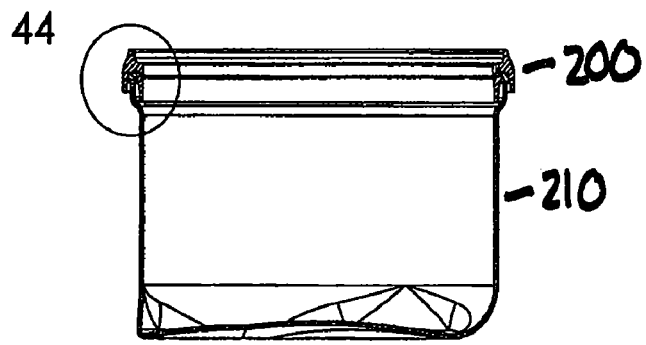
FIG. 43 is a sectional view taken at line 43-43 of FIG. 42.
Figure 44:
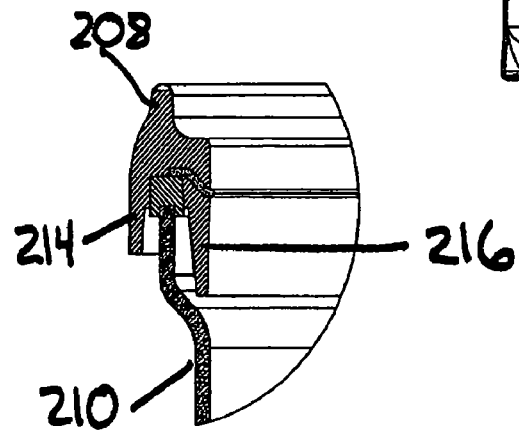
FIG. 44 is an enlarged fragmentary area of FIG. 43 at circle 44 showing the portion of the breakaway panel remaining imbedded in the frame.
Figure 45:
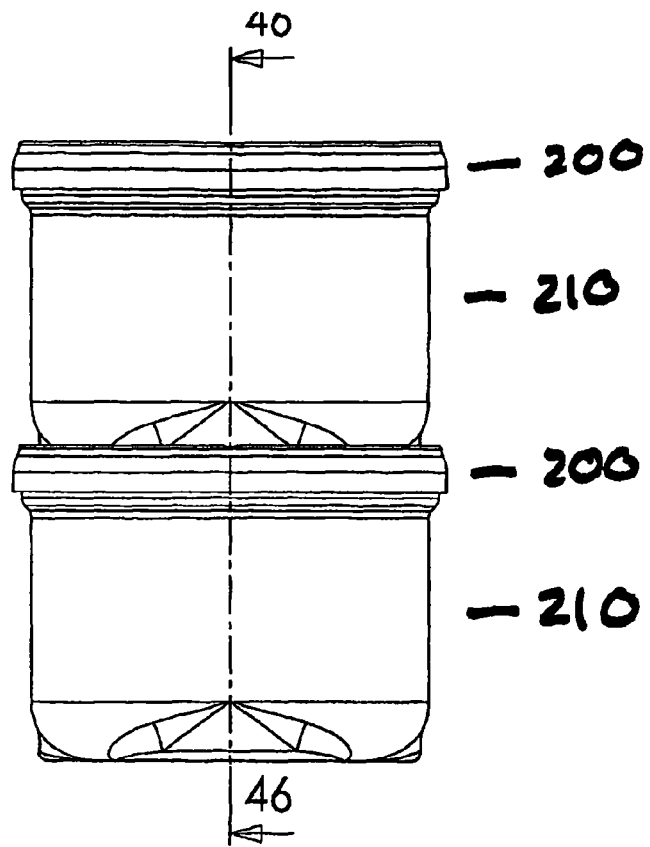
FIG. 45 is an elevated view showing the stacking of one package on another package.
Figure 47:
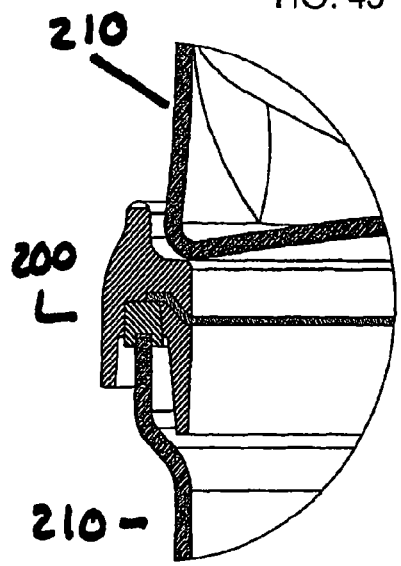
FIG. 47 is an enlarged fragmentary area of FIG. 46 at circle 47.
Figure 46:
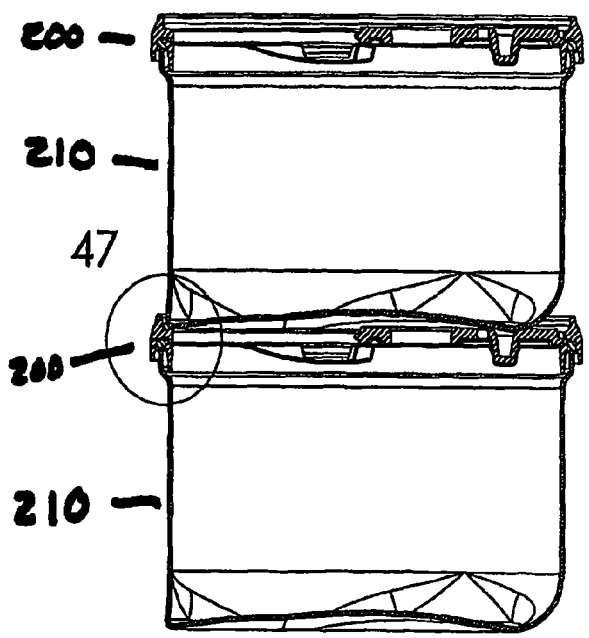
FIG. 46 is a sectional view taken at line 46-46 of FIG. 45 showing the manner in which the pedestal bottom of the container above nests into and on top of the frame of the container below.
Figure 51:
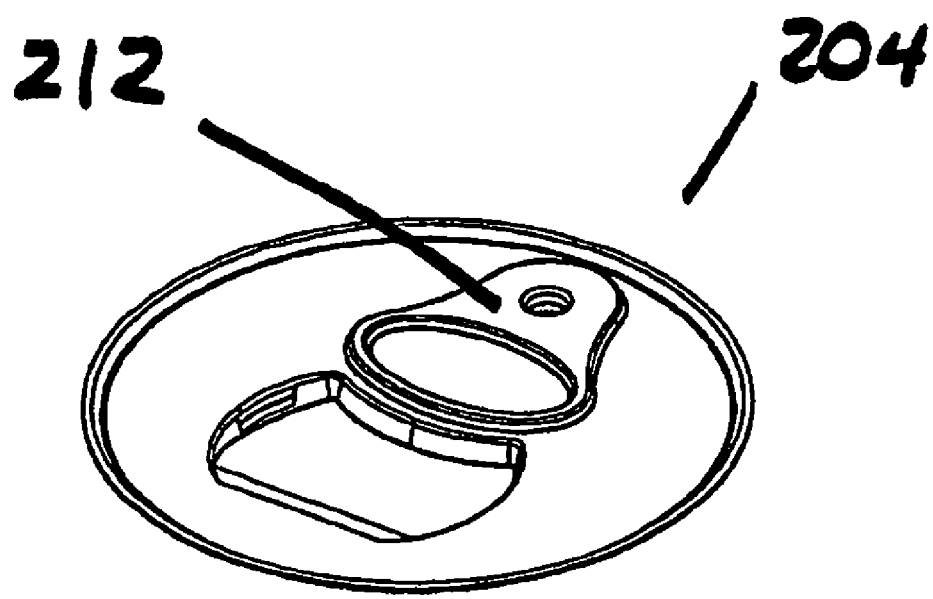
FIG. 51 is an isometric view of the high barrier, semi rigid plastic panel prior to it being inserted into the mold.

The second embodiment (FIGS. 22-51) of the closure, shown generally in FIGS. 22-24, consists of a frame 202 made from a thermoplastic polymeric material, a pre-formed, pre-treated, and pre-die-cut, multi-layered, semi-rigid, high-barrier plastic panel 204 and a fusion ring 206 made from an electro-magnetic, polymeric, fusible material suitable for bi-injection molding. These three components of the closure 200 have features which, in combination, offer unique functional and handling characteristics. The frame 202 includes a platform, which in conjunction with the fusion ring 206 retains the panel 204 in the closure 200. Outside and extending above this platform is a rim 208 feature. In combination, the rim 208 and platform serve to provide a means for the controlled stacking of the closures 200 one on top of the other (as shown in FIGS. 36-38) for improved handling prior to the closure 200 being placed on the container 210. This combination also serves to provide a "nest" area for the controlled stacking of one package on top of the other with the bottom of the container 210 sitting on the platform of the frame 202 and is controlled from lateral movement by the relationship of the outside surface of the container 210 being contained within the inner surface of the rim 208 (as shown in FIGS. 45-47). Inside of the platform, and connected to it at one or more points, is the ring-pull 212 feature. The ring-pull 212 feature is formed over the top surface of the tear-away panel 204 and includes a gripping area and an area that is anchored or bonded to the panel 204. The gripping area is not bonded to the panel 204. This ring-pull 212 feature is used to promote the separation and removal of a portion of the tear-away panel 204 from the closure 200. Below the platform are the locator legs 214 & 216, the fusion ring channel and the fusion ring 206. These features are of a similar design and have the same function as the corresponding features of the first embodiment. FIGS. 39-41 show the fusion of the closure 200 to the container 210 by means for the fusion ring 206 as described above for the first embodiment. The opening of the package, however, after the closure 200 has been fused to the container 210 is different.

To open this package, the grip area of the ring-pull 212 feature is lifted upward. The anchored portion remains connected to the tear panel 204. This results in a pivotal action that breaks the frangible connection(s) of the ring-pull 212 to the frame platform. As the grip area continues to be lifted upward, the panel 204 bends and through the resulting leveraging action, the tip of the pull-ring 212 continues to drive downward with a sharp edge on the underside of the pull-ring 212 near the frangible connection(s) breaking through the pre-scored cuts in the panel 204 which create a predetermined tear path around the area to be removed. The ring-pull 212 is lifted up and away from the package bringing the tear-away panel 204 with it thus opening the package, see FIGS. 42-44.

The panel component 204 (shown in FIG. 51) is manufactured prior to the manufacture of the frame 202 and the fusion ring 206 components of the closure 200. This panel 204 has desired gas, moisture barrier and physical properties required by the product or commercial sterilization process of the package. This panel 204 also has printed or coated on one side a release agent in an area that will contact the grip area of the ring-pull 212 feature. Generally this panel 204 is die cut from a sheet in a shape to match the corresponding shape of the frame and includes opposing, offset or aligned, pre-scored cuts in the panel 204 that create a pre-determined tear path around the area to be removed. The panel 204 is formed with a topology to match the shape of the grip area of the ring pull 212 feature. Outside of the pre-scored cuts there is a flange that will provide the non-removable attachment of that portion of the panel 204 to the frame 202.

The process for the manufacture of the closure 200 is as follows. A first mold section and a second mold section form a cavity for the molding of the fusion ring 206 (shown in FIGS. 25-29). This ring 206 includes a shelf feature for receiving the flange of the panel 204 and openings below the shelf. The second mold section is removed and the panel 204 is placed onto the ring 206 with the flange of the panel 204 contacting the shelf of the ring 206. A third mold section, in conjunction with the first mold section, the fusion ring 206 and the panel 204 forms the cavity for the frame 202 and the ring-pull 212. It is important to note that the passageway(s) in the fusion ring 206 below the shelf and the panel 204 flange allows for the flow through of the thermoplastic polymeric material for a complete molding of the frame 202 and ring-pull 212. Once the frame 202 and ring-pull 212 are molded, the closure 200 is released, ejected or removed from the mold.

The container 210 shown in FIGS. 23, 24 and 39-50 has features which enhance the function of the package. The container 210 sidewall steps inward just below the inner locator leg of the frame 202 so that the inside surface wall of the container 210 is in line with or inward of the inside surface of this leg 216. This allows for the easy removal of semi-solid or solid contents without the contents being caught on the locator leg. The bottom of the container 210 flares outward in order to be able to rest on the frame platform allowing the packages to be stacked (as shown in FIGS. 45-46). This flare out portion can be of any profile. It can be a continuous profile or can be a multitude of projecting features.

Either embodiment of the package may also be fitted with an optional, removable, snap-on overcap 218 (shown in FIGS. 48-50) to serve a variety of purposes. The outer wall of the overcap 218 fits over the outside leg of the closure 200. A bead on the inside surface of the overcap's 218 outer wall locates below the bottom outside edge of the outer leg 214 of the closure 200. The overcap 218 also includes a rim to act substantially the same as the rim 208 on the frame of the closure 200. In fact, it could be anticipated that if an overcap 218 with a rim is used on the package, it could eliminate the need for a rim 208 on the frame 202 of the closure 200. The overcap 218 could act as a protective cover for the package or the remaining contents of the package after the package has been opened and the tear-away membrane 104 or tear-away panel 204 has been removed and discarded. Optional opening (s) in the overcap 218 may serve as a means for venting heat and steam from the package during microwaving or cooking of the opened package's contents or to promote the drinking of a liquid product from the package.

While the description above refers to particular embodiments of the present invention, it will be understood that many modifications may be made without departing from the spirit thereof. The accompanying claims are intended to cover such modifications as would fall within the true scope and spirit of the present invention.

We claim:

1. A method for manufacturing a sealable container closure, comprising:
   providing a first mold section, a second mold section and a third mold section;
   mating the first mold section with the second mold section to form a first cavity area;
   injecting a fusible polymeric material into the first cavity area to form a fusible ring having a shelf and at least one passage between an inner periphery and an outer periphery of the fusible ring;
   removing the second mold section from the first mold section after the fusible polymeric material has been injected into the first cavity area to form the fusible ring;
   subsequently placing a panel on the shelf of the fusible ring;
   subsequently mating the third mold section with the first mold section to form a second cavity area within which the fusible ring is located; and
   subsequently injecting a thermoplastic polymeric material into the second cavity area to form a frame, wherein a first segment of the frame is within the inner periphery of the fusible ring, a second segment of the frame is outside the outer periphery of the fusible ring, and a third segment of the frame extends through the passage of the fusible ring between the first and second segments of the frame and wherein the panel, frame and fusible ring form the closure.

2. The method according to claim 1 wherein the fusible polymeric material is an electromagnetic material.

3. The method according to claim 1 wherein the fusible polymeric material is an oxygen scavenger.

4. The method according to claim 1 wherein the thermoplastic polymeric material includes one or more compounds selected from the group consisting of fumed silica, glass micro-spheres, talc, nano-clay, mica, calcium carbonate, iron powder, nylon, and EVOH.

5. The method of claim 1 wherein the panel includes a grip means for removing at least a portion of the panel.

6. The method of claim 5 wherein the grip means is a pull tab which extends from the panel.

7. The method of claim 5 wherein the grip means is a ring pull which is attached to the surface of the panel.

8. A method for manufacturing a sealable container closure, comprising:
   providing a first mold section, a second mold section and a third mold section;
   mating the first mold section with the second mold section to form a first cavity area;
   injecting a fusible polymeric material into the first cavity area to form a fusible ring having an inner periphery, an outer periphery and at least one passage extending between the inner periphery and the outer periphery of the fusible ring;

removing the second mold section from the first mold section after the fusible polymeric material has been injected into the first cavity area to form the fusible ring;

subsequently placing a panel on the fusible ring;

subsequently mating the third mold section with the first mold section to form a second cavity area within which the fusible ring is located; and subsequently injecting a thermoplastic polymeric material into the second cavity area to form a frame, wherein a first segment of the frame is within the inner periphery of the fusible ring, a second segment of the frame is outside the outer periphery of the fusible ring, and a third segment of the frame extends through the passage of the fusible ring between the first and second segments of the frame, wherein the panel, the frame and the fusible ring form the closure.

9. A method for manufacturing a sealable container closure, comprising:

providing a first mold section, a second mold section and a third mold section;

mating the first mold section with the second mold section to form a first cavity area;

injecting a fusible polymeric material into the first cavity area to form a fusible ring having an inner periphery, an outer periphery and at least one passage extending between the inner periphery and the outer periphery of the fusible ring, wherein the inner periphery of the fusible ring defines the boundary of an open inner area;

removing the second mold section from the first mold section after the fusible polymeric material has been injected into the first cavity area to form the fusible ring;

positioning a closure panel within the open inner area of the fusible ring;

subsequently mating the third mold section with the first mold section to form a second cavity area within which the fusible ring and the closure panel are located; and subsequently injecting a thermoplastic polymeric material into the second cavity area to form a frame, wherein a first segment of the frame is within the inner periphery of the fusible ring, a second segment of the frame is outside the outer periphery of the fusible ring, and a third segment of the frame extends through the passage of the fusible ring between the first and second segments of the frame, wherein at least the first segment of the frame is formed around the closure panel, and wherein the frame, the closure panel and the fusible ring form the closure.

10. The method of claim 9, wherein the step of positioning the closure panel within the open inner area of the fusible ring is carried out by placing an edge of the closure panel on the fusible ring.

11. The method of claim 10, wherein the step of placing the edge of the closure panel on the fusible ring is carried out by placing the edge of the closure panel on a shelf area defined by the fusible ring.

* * * * *